US007693714B2

(12) United States Patent
Iser et al.

(10) Patent No.: US 7,693,714 B2
(45) Date of Patent: Apr. 6, 2010

(54) SYSTEM FOR GENERATING A WIDEBAND SIGNAL FROM A NARROWBAND SIGNAL USING TRANSMITTED SPEAKER-DEPENDENT DATA

(75) Inventors: Bernd Iser, Ulm (DE); Gerhard Uwe Schmidt, Ulm (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1102 days.

(21) Appl. No.: 11/343,939

(22) Filed: Jan. 31, 2006

(65) Prior Publication Data

US 2006/0190254 A1 Aug. 24, 2006

(30) Foreign Application Priority Data

Jan. 31, 2005 (EP) ................................ 05001960

(51) Int. Cl.
*G10L 15/06* (2006.01)

(52) U.S. Cl. ..................................................... 704/243

(58) Field of Classification Search .................. 704/243
See application file for complete search history.

(56) References Cited

U.S. PATENT DOCUMENTS 6,532,446 B1 * 3/2003 King ...................... 704/270.1

FOREIGN PATENT DOCUMENTS

WO WO 03/003350 1/2003

OTHER PUBLICATIONS

J. Epps, et al., "A New Technique for Wideband Enhancement of Coded Narrowband Speech," School of Electrical Engineering and Telecommunications, The University of New South Wales (1999); 3 pages.

Cheung-Fat Chan, et al., "Wideband Re-Synthesis of Narrowband CELP-Coded Speech Using Multiband Excitation Model," Department of Electronic Engineering, City University of Hong Kong (1996); 4 pages.

* cited by examiner

*Primary Examiner*—Susan McFadden

(57) ABSTRACT

An electronic communication system is set forth that includes the transmission of a narrowband speech signal corresponding to a narrowband version of speech utterances of a speaker as well as the transmission of speaker-dependent data. The speaker-dependent data may be used to correlate narrowband versions of the speech utterances of the speaker with corresponding wideband versions of the speech utterances of the speaker. Both the narrowband speech signal and the speaker-dependent data are received by a receiving party. A receiver at the receiving party uses the narrowband speech signal and the speaker-dependent data to generate a wideband speech signal corresponding to a wideband version of the speech utterances of the speaker.

30 Claims, 8 Drawing Sheets

SYSTEM FOR GENERATING A WIDEBAND SIGNAL FROM A NARROWBAND SIGNAL USING TRANSMITTED SPEAKER-DEPENDENT DATA

BACKGROUND OF THE INVENTION

Priority Claim

This application claims the benefit of priority from European Patent Application No. 05001960.3, filed Jan. 31, 2005, which is incorporated by reference.

1. Technical Field

The present invention relates to a system and corresponding method for generating a wideband signal from a narrowband signal, such as acoustic speech signals transmitted over a telephone system. More particularly, the present invention relates to a system that uses transmitted speaker-dependent data to generate the wideband signal from the narrowband signal.

2. Related Art

The quality of transmitted audio signals often suffers from bandwidth limitations. Unlike face-to-face speech communication, that may take place over a frequency range from approximately 20 Hz to 18 kHz, communication by landline telephones and cellular phones is characterized by a substantially narrower bandwidth. For example, telephone audio signals, in particular, speech signals, are generally limited to a narrow bandwidth between 300 Hz-3.4 kHz. The audio components of speech signals that are lower and higher end frequency are simply not transmitted thereby resulting in a degradation in speech quality compared to face-to-face speech communications. This may cause problems in properly reproducing the speech at the receiving end and result in reduced intelligibility of the speech signal.

Several approaches have been taken to address such audio transmission problems. For example, several digital networks have been developed that have a higher speech transmission bandwidth than conventional telephone systems. Digital networks, such as the Integrated Service Digital Network (ISDN) and the Global System for Mobile Communication (GSM), have higher bandwidth speech transmission channels that allow for transmission of signal components with frequencies below and above the limited bandwidth of conventional systems. However, the higher bandwidth transmission channels result in a corresponding increase in network complexity and costs.

Other solutions have likewise been proposed to address the insufficiencies of narrowband speech transmissions. One proposed solution consists in combining two or more narrowband speech channels for the transmission of a single speech signal. However, this solution places significant demands on the telephone network and substantially reduces the amount of communications traffic that may be carried by existing equipment.

Another proposed solution consists in the utilization of speech codebooks at the receiver to construct wideband speech signals from received narrowband speech signals. In accordance with this approach, the receiver includes a narrowband codebook containing narrowband signal vector parameters and a corresponding wideband codebook containing wideband codebook signal vector parameters. The codebooks are generated to define the correspondence between narrowband and wideband spectral envelope representations of speech signals. In practice, an analysis of the received narrowband speech signal is used to select which of the narrowband signal vector parameters of the narrowband codebook provide the best correspondence with the received narrowband speech signals. The selected narrowband signal vector parameter is then used to select a corresponding wideband codebook signal vector parameter of the wideband codebook. In turn, the selected wideband codebook signal vector parameter is used to generate a wideband speech signal that corresponds to the received narrowband speech signal.

Other proposed solutions involve the use of neural networks to generate wideband speech signals from narrowband speech signals. More particularly, signal characteristics extracted from a received speech signal are used as input signals to a neural network to generate output signals that are used in the generation of wideband speech signals.

Codebooks and neural networks are typically generated in a training operation that occurs during the system design phase. Moreover, the training is executed in a speaker-independent manner, since the end user is not known a priori. Consequently, large databases have to be processed and generated to make the codebooks and/or neural networks applicable to a wide range of end users. This results in a system that is generic to many potential users, but is not optimized for operation with one or more end-users of the particular device. Additionally, the generic nature of the system may impose significant computational requirements on the system design resulting in increased costs and decreased reliability. Thus, there is a need for improvements in systems that generate wideband acoustic signals from received narrowband acoustic signals.

SUMMARY

An electronic communication system is set forth that includes the transmission of a narrowband speech signal corresponding to a narrowband version of speech utterances of a speaker as well as the transmission of speaker-dependent data. The speaker-dependent data may be used to correlate narrowband versions of the speech utterances of the speaker with corresponding wideband versions of the speech utterances of the speaker. Both the narrowband speech signal and the speaker-dependent data are received by a receiving party. A receiver at the receiving party uses the narrowband speech signal and the speaker-dependent data to generate a wideband speech signal corresponding to a wideband version of the speech utterances of the speaker.

The speaker-dependent data may take on different forms. For example, the speaker-dependent data may include the parameters of a neural network. Alternatively, or in addition, speaker-dependent data may include parameters used in non-linear mapping techniques, such as those involving a speaker-dependent narrowband codebook and a speaker-dependent wideband codebook. Speaker-independent data that is not transmitted by the speaking party also may be included at the receiver. Like the speaker-dependent data the speaker-independent data may take on many forms. However, unlike the speaker-dependent data, the speaker-independent data is not generated using the speech utterances of the speaking party. Rather, the speaker-independent data is generic to multiple speakers.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
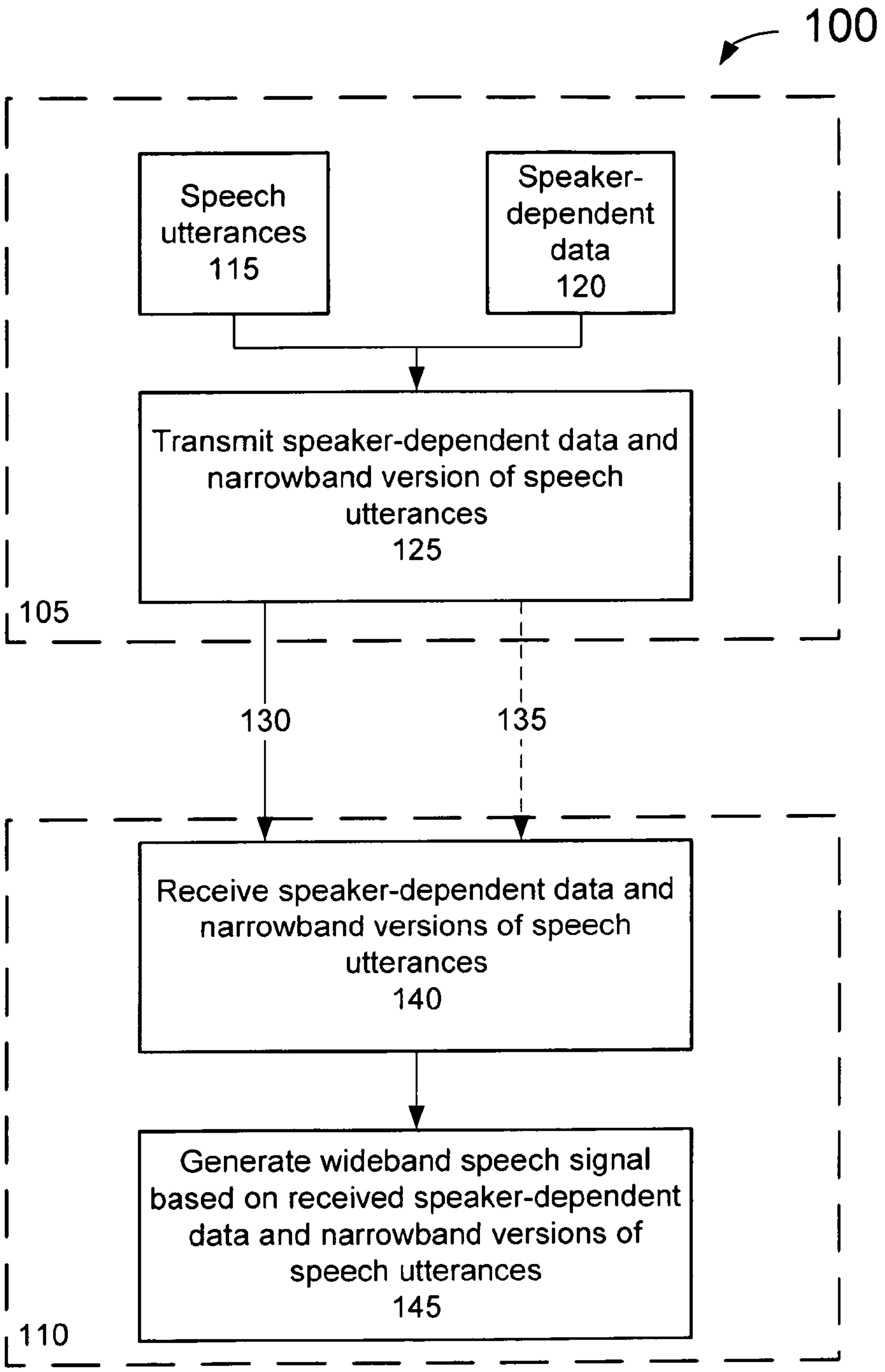
FIG. 1 is a block diagram of an exemplary system in which wideband speech signals are developed from received narrowband speech signals.

One example of a system implementing a method in which wideband speech signals are developed from received narrowband speech signals is shown in FIG. 1. More particularly, the system 100 may be used to generate analog signals that have a larger frequency range than the frequency range of the corresponding received analog signals. As such, whether a signal is a wideband signal or a narrowband signal is dependent on its relation to the other.

As shown in FIG. 1, the system 100 includes a transmitter 105 that is used by a transmitting party and a receiver 110 that is used by a receiving party. At the transmitter 105, speech utterances 115 are generated by the transmitting party at block 115. At block 120, the transmitter 105 also includes speaker-dependent data that is unique to the transmitting party. The speaker-dependent data comprises data that correlates narrowband versions of speech utterances of the transmitting party with corresponding wideband versions of the speech utterances of the transmitting party. The speaker-dependent data may be generated in a training phrase that occurs prior to the generation of the speech utterances at block 115, or may be generated in an operation that occurs concurrently with the generation of the speech utterances at block 115.

The speech utterances of block 115 and the speaker-dependent data of block 120 may be transmitted over one or more transmission channels at block 125. More particularly, the transmitter 105 converts the speech utterances of block 115 to a narrowband version of the original speech utterances for transmission in accordance with, for example, one or more telecommunications transmission standards. Transmission of the narrowband version of the original speech utterances and of the transmission of the speaker-dependent data may take place over a single transmission channel 130. Alternatively, the narrowband version of the original speech utterances may be transmitted over transmission channel 130 and the speaker-dependent data may be transmitted over a second transmission channel 135. The transmissions of the narrowband version of the original speech utterances and the speaker-dependent data may occur in a generally concurrent manner or, for example, may occur at separate times during the transmission process. Transmission channels suitable for use in this example as well as in the examples set forth below include conventional telephone network channels, wireless cellular network channels, wireless walkie-talkie systems, conventional wired networks, or the like. The narrowband speech signals used in such transmission systems may be limited to a bandwidth of 300 Hz-3.4 kHz, which corresponds to the bandwidth used to transmit speech signals using a Global System for Mobile Communications (GSM) network.

At block 140, the receiver 110 receives the speaker-dependent data and the narrowband versions of the speech utterances using one or both of the transmission channels 130 and 135. The receiver 110 uses the speaker-dependent data and narrowband versions of the speech utterances that are received to generate a wideband speech signal that corresponds to a wideband version of the speech utterances at block 115 of the transmitter 105.

Figure 2:
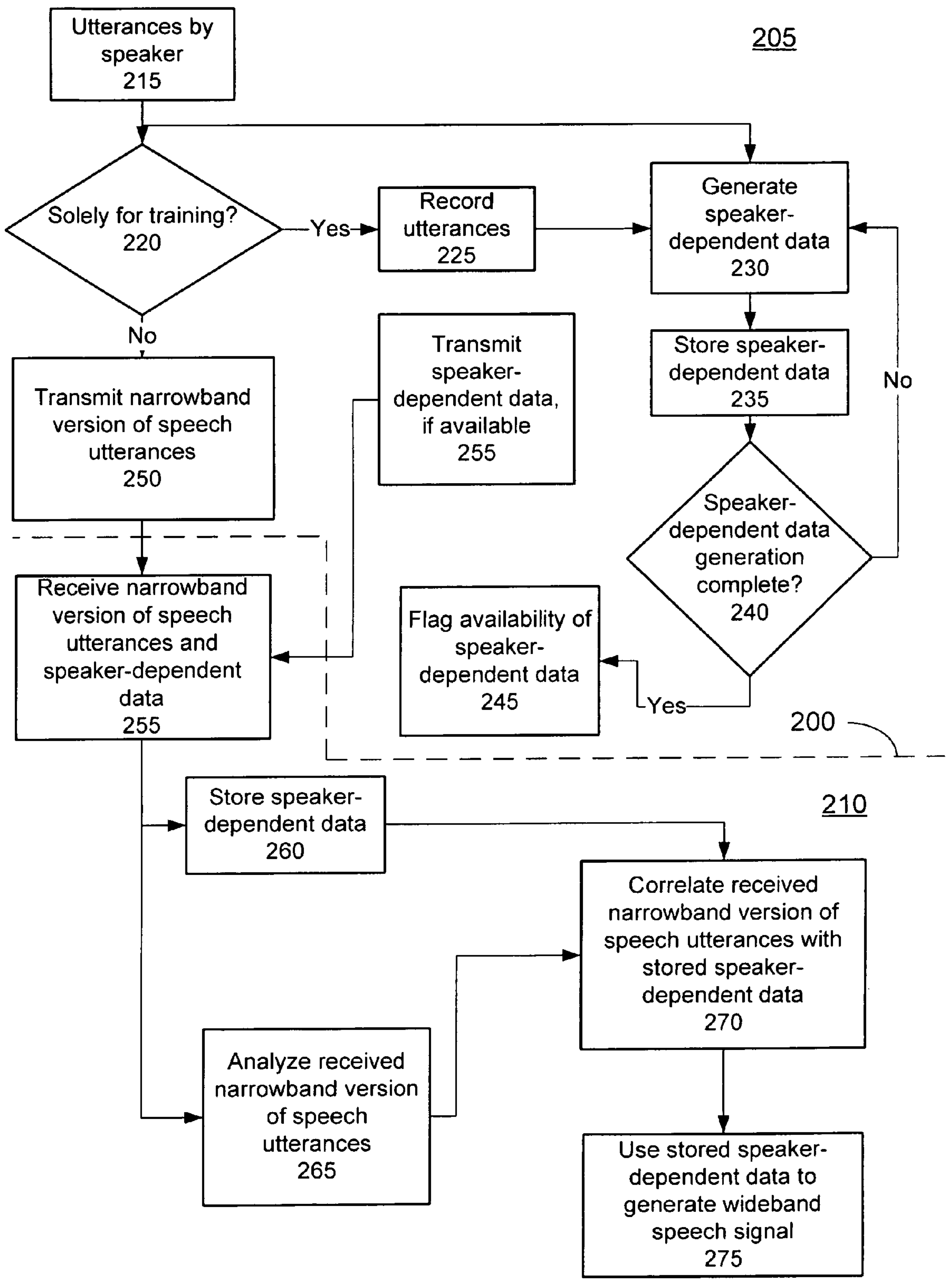
FIG. 2 is a block diagram of a further exemplary system of the type set forth in FIG. 1 showing one specific manner in which the speaker-dependent data may be generated at a transmitter of a first communicating party and used at a receiver of a second communicating party.

Another example of a system implementing a method in which wideband speech signals are developed from received narrowband speech signals is shown in FIG. 2. In this example, dotted line 200 divides operations that may be executed by a transmitter 205 from the operations that may be executed by a receiver 210. Based on the flow of operations shown in FIG. 2, speech utterances of a party that will use the transmitter 205 are entered at block 215. A check is made at block 220 to determine whether the speech utterances of block 215 are solely for use during a training phase. If the result of this check is affirmative, the speech utterances may, if desired, be recorded at block 225 pursuant to an off-line training process. In this training process, either the contemporaneous speech utterances of block 215 or the recorded speech utterances of block 225 are used to generate speaker-dependent data at block 230. As the data is generated, it is stored at block 235 in, for example, a database for subsequent transmission to the receiver 210. A check is made at block 240 to determine whether generation of the speaker-dependent data has been completed. If not, continued generation of the data proceeds at block 230. Otherwise, an indication that the speaker-dependent data is completely generated and available for transmission to a receiving party is provided at block 245.

Other alternatives may be used in connection with the recording executed at block 225. For example, rather than using conventional PCM data to store the speech training data, the recording operation of block 225 may analyze the speech utterances and store corresponding coefficients of a linear predictive code. Further, the speech utterances used at block 225 may comprise speech utterances obtained during prior telephone calls and, as such, is not limited to speech utterances obtained during a training phase. Some manner of speaker identification may be employed to make sure that the person currently speaking is the same individual who has spoken during the recordings and/or during the generation of the speaker-dependent data.

If a determination is made at block that the utterances of block 215 are provided for transmission to a receiving party (i.e., the utterances are not provided solely for training purposes), then a narrowband version of the speech utterances may be transmitted at block 250. Additionally, the speaker-dependent data stored during the operation of block 235 may be transmitted to the receiving party in the operation shown at block 255. As such, transmission of the speaker-dependent data in this example does not take place until it has been completely generated.

At block 255, the receiver 210 receives the narrowband version of the speech utterances as well as any speaker-dependent data that is transmitted by transmitter 205. Any speaker-dependent data that is received at block 255 may be stored for further use at block 260 in, for example, a database. The narrowband version of the speech utterances may be analyzed at block 265 to extract one or more speech characteristics that may be used to correlate the narrowband version of the speech utterances with corresponding speaker-dependent wideband data of the speaker-dependent data stored during the operation of block 260. A correlation between the one or more extracted speech characteristics and corresponding data of the stored speaker-dependent data may be made at block 270, and the result of the correlation may be used to generate a wideband speech signal at block 275. Since the wideband speech signal generated at block 275 is derived from the narrowband version of the actual speech utterances of the transmitting party as well as from speaker-dependent data generated using the speech utterances of the transmitting party, the resulting wideband signal represents a close approximation to a wideband version of the original speech utterances of block 215.

Figure 3:
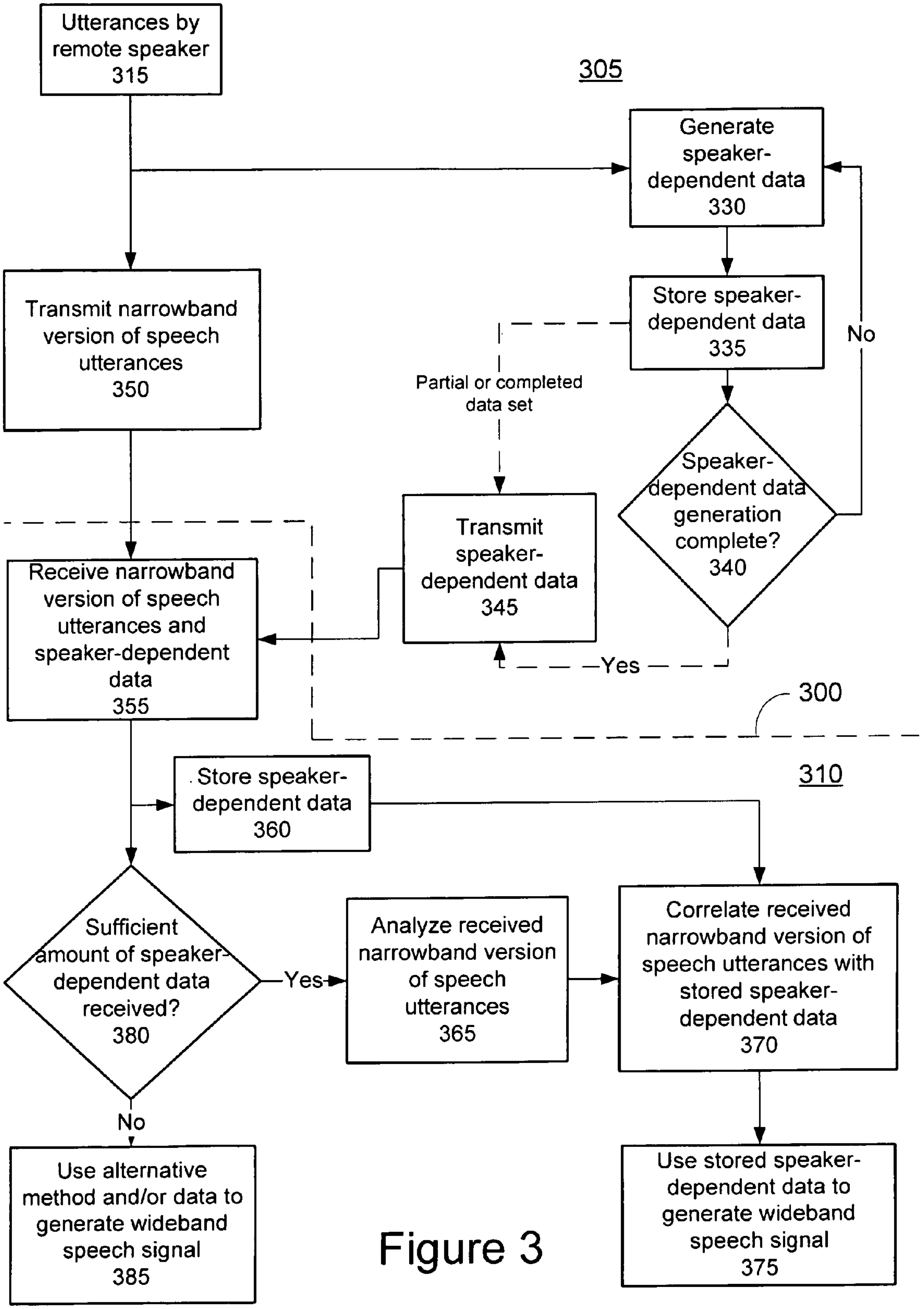
FIG. 3 is a block diagram of a further exemplary system of the type set forth in FIG. 1 showing one specific manner of combining the use of speaker-dependent data with the use of speaker-independent data.

A further example of a system implementing a method in which wideband speech signals are developed from received narrowband speech signals is shown in FIG. 3. In this example, dotted line 300 divides operations that may be executed by a transmitter 305 from the operations that may be executed by a receiver 310. Based on the flow of operations shown in FIG. 3, speech utterances of a party that will use the transmitter 305 are entered at block 315. The contemporaneous speech utterances of block 315 are used to generate speaker-dependent data at block 330. As the data is generated, it is stored at block 335 in, for example, a database for subsequent transmission to the receiver 310. The speaker-dependent data may be transmitted at block 345 as it is generated. Alternatively, the transmitter 305 may wait until the generation of the speaker-dependent data is complete before it is transmitted at block 345. To this end, a check may be made at block 340 to determine whether further speaker-dependent data remains to be generated. If so, continued generation of the data may proceed at block 330. Otherwise, the completed form of the speaker-dependent data is transmitted at block 345. A narrowband version of the speech utterances of block 315 are provided for transmission to a receiving party at block 350.

At block 355, the receiver 310 receives the narrowband version of the speech utterances as well as any speaker-dependent data that is transmitted by transmitter 305. Any speaker-dependent data that is received at block 355 may be stored for further use at block 360 and, for example, a database. The narrowband version of the speech utterances may be analyzed at block 365 to extract one or more speech characteristics that may be used to correlate the narrowband version of the speech utterances with corresponding speaker-dependent wideband data of the speaker-dependent data transmitted at block 345. A correlation between the one or more extracted speech characteristics and corresponding data of the stored speaker-dependent data may be made at block 370, and the result of the correlation may be used to generate a wideband speech signal at block 375.

In some instances, the receiver 310 may generate a speech signal corresponding to the speech utterances of the transmitting party prior to receiving a sufficient portion of the speaker-dependent data. As such, a check may be made at block 380 to determine whether a sufficient amount of speaker-dependent data has been received to generate a corresponding wideband speech signal. If sufficient data has been received, generation of the corresponding wideband signal may proceed in the manner set forth above. However, if sufficient data has not been received, an alternative manner of generating the corresponding speech signal may be executed at block 385. The alternative may include the use of an alternative method, such as the direct use of the narrowband version of the speech utterances to generate the speech signal. Further, the alternative may include the use of alternative data, such as the data found in a speaker-independent codebook or the data associated with a speaker-independent neural network.

Figure 4:
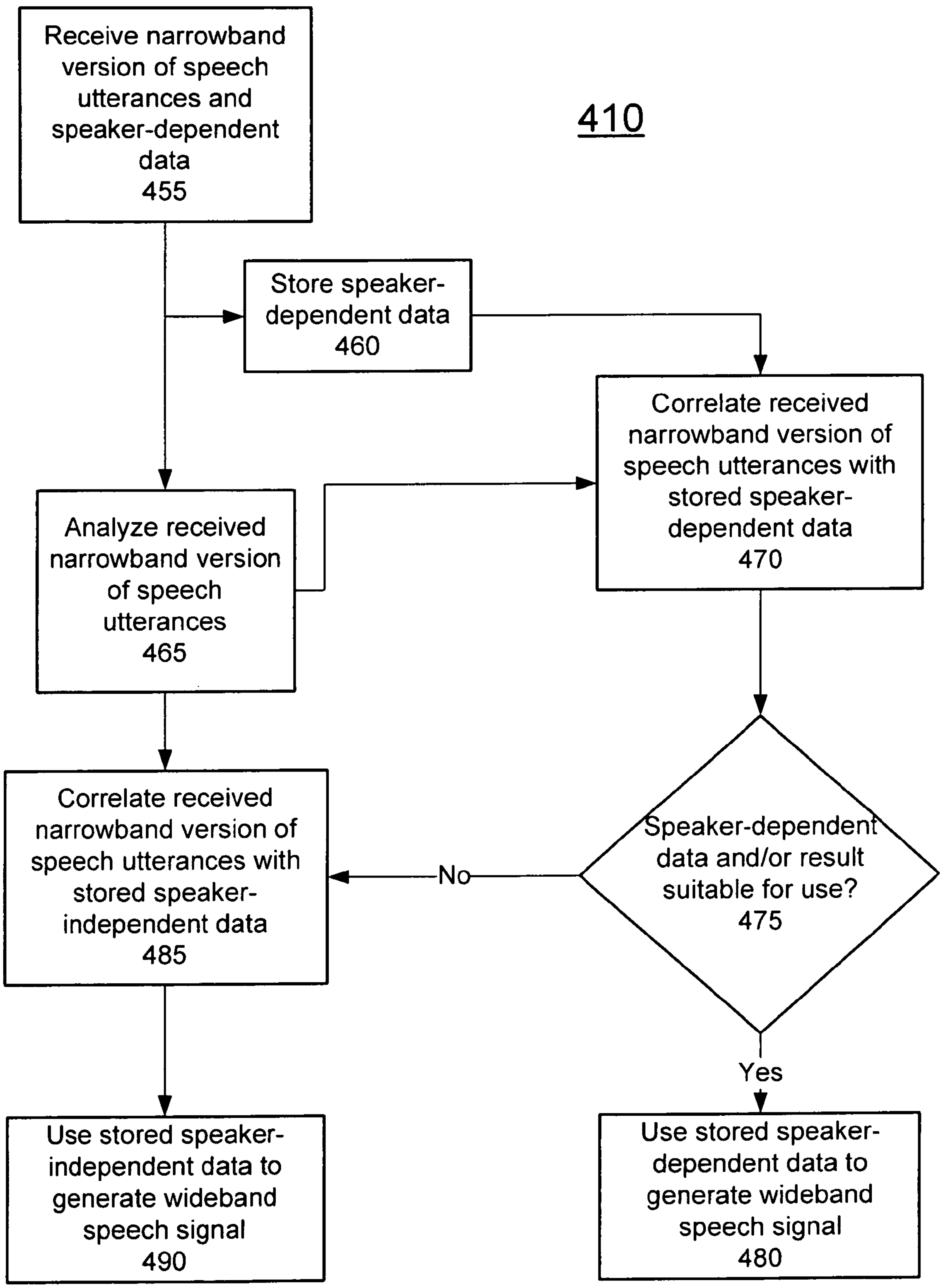
FIG. 4 is a block diagram illustrating a further set of operations that may be executed by a receiver at the second communicating party.

FIG. 4 illustrates one manner in which a receiver 410 may employ narrowband versions of speech utterances and speaker-dependent data provided by a transmitting party. As shown, a narrowband version of the speech utterances of the transmitting party as well as speaker-dependent data for the transmitting party are received at block 455. At block 460, the receiver 410 stores the speaker-dependent data for further use in, for example, a database. The narrowband version of the speech utterances may be analyzed at block 465 to extract one or more speech characteristics that may be used to correlate the narrowband version of the speech utterances with corresponding speaker-dependent wideband data of the speaker-dependent stored at block 460. A correlation between the one or more extracted speech characteristics and the corresponding data of the stored speaker-dependent data may be made at block 470. At block 475, a check is made to determine whether the speaker-dependent data and/or data resulting from the correlation operation executed at block 470 is suitable for use in generating the wideband speech signal. If the check determines that such use is suitable, the speaker-dependent data is used to generate a wideband speech signal at block 480. However, if the check executed at block 475 determines that such use is not suitable, a correlation is made between the received narrowband version of speech utterances and stored speaker-independent data at block 485. The stored speaker-independent data may comprise data relating the narrowband speech utterances of a generic speaker with corresponding wideband speech utterances of the generic speaker. The result of this correlation is employ at block 490 to generate a wideband speech signal that corresponds to the narrowband version of the speech utterances received at block of 455.

The foregoing systems have been described in the context of a single transmitting party and a single receiving party. However, it will be recognized that a transceiver may be employed by each communicating party, where both the first and second parties send and receive speech communications. To this end, a first communicating party may use a transceiver having a transmitter that transmits both a narrowband version of speech utterances of the first communicating party as well as speaker-dependent data unique to the first communicating party. As noted above, the speaker-dependent data generated for the first communicating party comprises data that may be used to correlate narrowband versions of speech utterances of the first communicating party with corresponding wideband versions of the speech utterances of the first communicating party. Similarly, a second communicating party may use a transceiver having a transmitter that transmits both a narrowband version of speech utterances of the second communicating party as well as speaker-dependent data unique to the second communicating party. Likewise, the speaker-dependent data generated for the second communicating party comprises data that may be used to correlate narrowband versions of speech utterances of the second communicating party with corresponding wideband versions of the speech utterances of the second communicating party.

Figure 5:
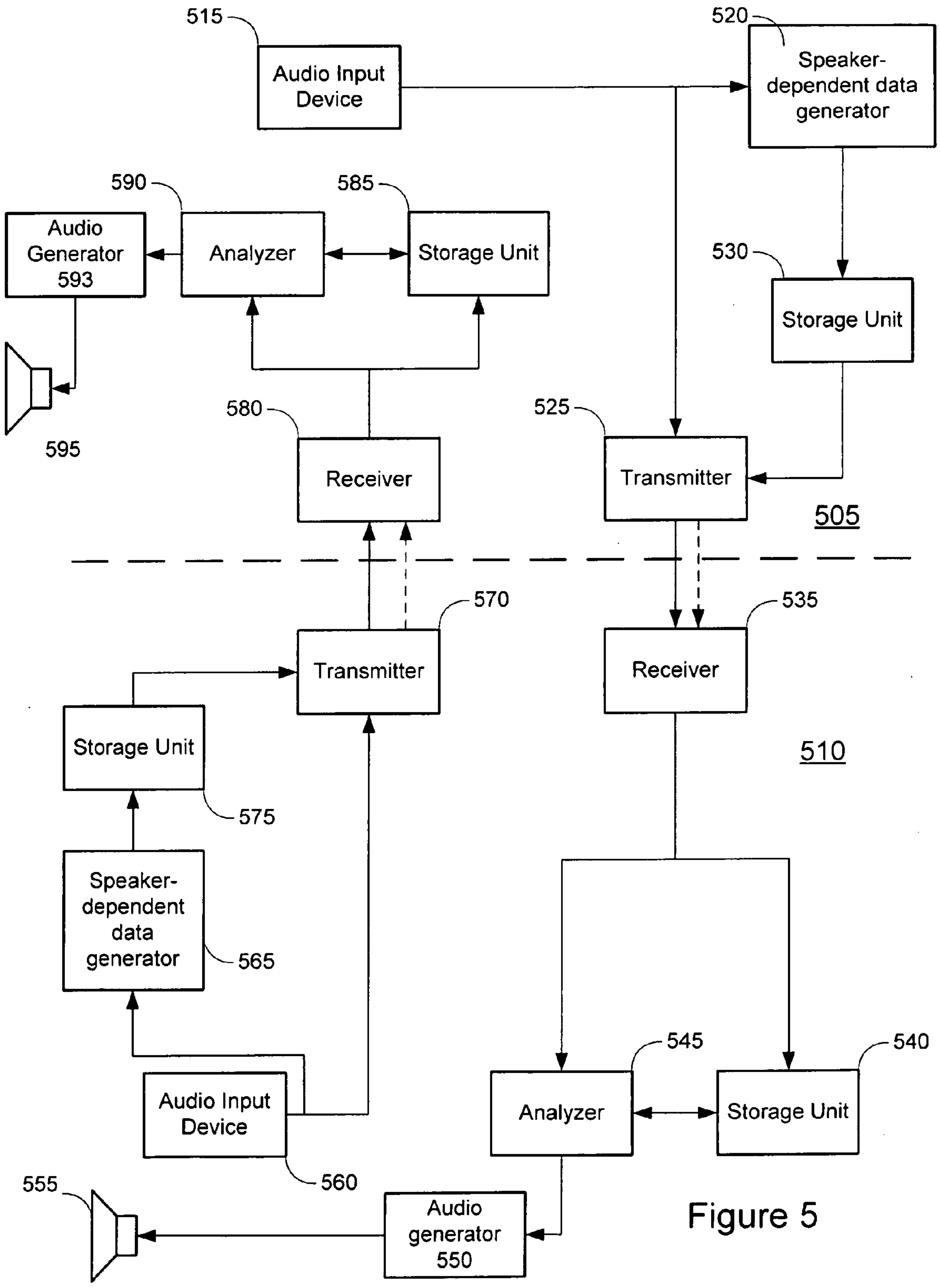
FIG. 5 is a schematic block diagram of a pair of transceivers that may be used to facilitate speech communications between first and second communicating parties in accordance with the operations shown in one or more of FIGS. 1 through 4.

The receiver used by the first communicating party may be adapted to receive both the narrowband version of the speech utterances of the second communicating party as well as the speaker-dependent data of the second communicating party. The receiver generates a wideband speech signal using the speaker-dependent data of the second communicating party. The receiver used by the second communicating party may be adapted to receive both the narrowband version of the speech utterances of the first communicating party as well as the speaker-dependent data of the first communicating party. The receiver generates a wideband speech signal using the speaker-dependent data of the first communicating party. Variations of the foregoing multiple party transceiver system may be developed. For example, the transmitter and receiver operations set forth above in FIGS. 1 through 4 may be employed in various combinations depending on system requirements. Save document FIG. 5 is a system block diagram of one example of a two-way communication system in which wideband speech signals are generated from narrowband signals using transmitted speaker-dependent data. As shown, the system includes a first transceiver 505 for use by a first communicating party and a second transceiver 510 for use by a second communicating party.

The first transceiver 505 receives speech utterances from the first communicating party through the audio input device 515. The output of the device 515 is available to one or both of a speaker-dependent data generator 520 and/or a transmitter 525. The speaker-dependent data generator 520 is adapted to generate speaker-dependent data comprising data that can be used to correlate narrowband versions of the speech utterances of the first communicating party with corresponding wideband versions of the speech utterances of the first indicating party. The data generated by the speaker-data generator 520 may be stored in one or more storage units 530 in, for example, a database. Both the speaker-dependent data and a narrowband version of the speech utterances at audio input device 515 are transmitted to the second communicating party by transmitter 525 over one or more communication channels. To this end, the speaker-dependent data and the narrowband version of the speech utterances may be transmitted over a single transmission channel. Alternatively, the speaker-dependent data may be transmitted over a first transmission channel while the narrowband version of the speech utterances may be transmitted over a second transmission channel.

The speaker-dependent data and the narrowband version of the speech utterances sent from transceiver 505 of the first communicating party may be received by the second communicating party at receiver 535 of transceiver 510. The receiver 535 provides the received speaker-dependent data for storage in one or more storage units 540, while the received narrowband version of the speech utterances of the first communicating party are provided to the input of an analyzer 545. The analyzer 545 extracts one or more feature characteristics of the received narrowband signal and correlates it with corresponding wideband signal data of the speaker-dependent data stored in storage unit 540.

Checking operations, such as those illustrated in connection with receiver 310 of FIG. 3 and receiver 410 of FIG. 4, also may be executed by the analyzer 545 to select the proper method and/or data that will be used to generate a corresponding wideband signal at transceiver 510. The output of analyzer 545 is provided to the input of an audio generator 550. Audio generator 550, in turn, uses the output of analyzer 545 to generate an audio signal corresponding to a wideband version of the speech utterances provided by the first communicating party at audio input device 515 of transceiver 510. The resulting audio signal may be output to a speaker 555, or the like.

The second transceiver 510 receives speech utterances from the second communicating party through an audio input device 560. The output of the device 560 is available to one or both of a speaker-dependent data generator 565 and/or a transmitter 570. The speaker-dependent data generator 565 is adapted to generate speaker-dependent data comprising data that can be used to correlate narrowband versions of the speech utterances of the second communicating party with corresponding wideband versions of the speech utterances of the second indicating party. The data generated by the speaker-data generator 565 may be stored in one or more storage units 575. Both the speaker-dependent data and a narrowband version of the speech utterances at audio input device 560 are transmitted to the first communicating party by transmitter 570 over one or more communication channels. To this end, the speaker-dependent data and the narrowband version of the speech utterances may be transmitted over a single transmission channel. Alternatively, the speaker-dependent data may be transmitted over a first transmission channel while the narrowband version of the speech utterances may be transmitted over a second transmission channel. These channels may be the same or different from those used by the transceiver 505.

The speaker-dependent data and the narrowband version of the speech utterances sent from transceiver 510 of the second communicating party may be received by the first communicating party at receiver 580 of transceiver 505. The receiver 580 provides the received speaker-dependent data for storage in one or more storage units 585, while the received narrowband version of the speech utterances of the second communicating party are provided to the input of an analyzer 590. The analyzer 590 extracts one or more feature characteristics of the narrowband signal received by receiver 580 and correlates it with corresponding wideband signal data of the speaker-dependent data stored in storage unit 585.

Checking operations, such as those illustrated in connection with receiver 310 of FIG. 3 and receiver 410 of FIG. 4, also may be executed by the analyzer 590 to select the proper method and/or data that will be used to generate a corresponding wideband signal at transceiver 505. The output of analyzer 590 is provided to the input of an audio generator 593. Audio generator 593, in turn, uses the output of analyzer 590 to generate an audio signal corresponding to a wideband version of the speech utterances provided by the second communicating party at audio input device 560 of transceiver 505. The resulting audio signal may be output to a speaker 595, or the like.

The speaker-dependent data in each of the foregoing systems may comprise narrowband speech parameters and the associated wideband speech parameters. The narrowband parameters may comprise characteristic parameters for the determination of narrowband spectral envelopes and/or the pitch and/or the short-time power and/or the highband-pass-to-lowband-pass power ratio and/or the signal-to-noise ratio generated in response to speech utterances of the transmitting party. Similarly, the wideband parameters may comprise wideband spectral envelopes and/or characteristic parameters for the determination of wideband spectral envelopes and/or wideband excitation signals corresponding to the narrowband parameters.

The speaker-dependent data may correspond to parameters used in a neural network. Artificial neural networks may be employed that are composed of many computing elements, usually denoted neurons, and working in parallel. The elements are connected by synaptic weights, which are allowed to adapt through learning or training processes. Different network types may be employed, e.g. a model including supervised learning in a feed-forward (signal transfer) network. The neural network is given an input signal, which is transferred forward through the network. Eventually, an output signal is produced. The neural network can be understood as a way to map a narrowband input space to a wideband output space. This mapping is defined by the various parameters of the model, which include the synaptic weights connecting the neurons.

One such neural network is known as a Multi-Layer Perceptron network. The basic unit (neuron) of the network is a perceptron. This is a computation unit, which produces its output by taking a linear combination of the input signals and by transforming the linear combination by a function called in activity function. The output of the perceptron as a function of the input signals can thus be written:

$$y=\sigma(\Sigma w_i x_i+\theta),$$

where y is the output, $x_i$ is the input signals ($i=1, \ldots, n$), $w_i$ is the neuron weights, $\theta$ is the bias term (another neuron weight) and $\sigma$ is the activity function. Possible forms of the activity function are linear function, step function, logistic function and hyperbolic tangent function. The kind of activity function may be transmitted together with the weights and bias term as part of the speaker-dependent data. Alternatively, the activity function may be pre-determined in the neural networks employed at the receiving party so that the speaker-dependent data comprises the weights and bias terms and excludes the activity functions used by the neural network.

The speaker-dependent data may also take the form of a non-linear mapping correspondence between narrowband speech signals of the transmitting party and wideband speech signals of the transmitting party. Speaker-dependent narrowband and wideband codebooks may be used for this purpose.

Figure 6:
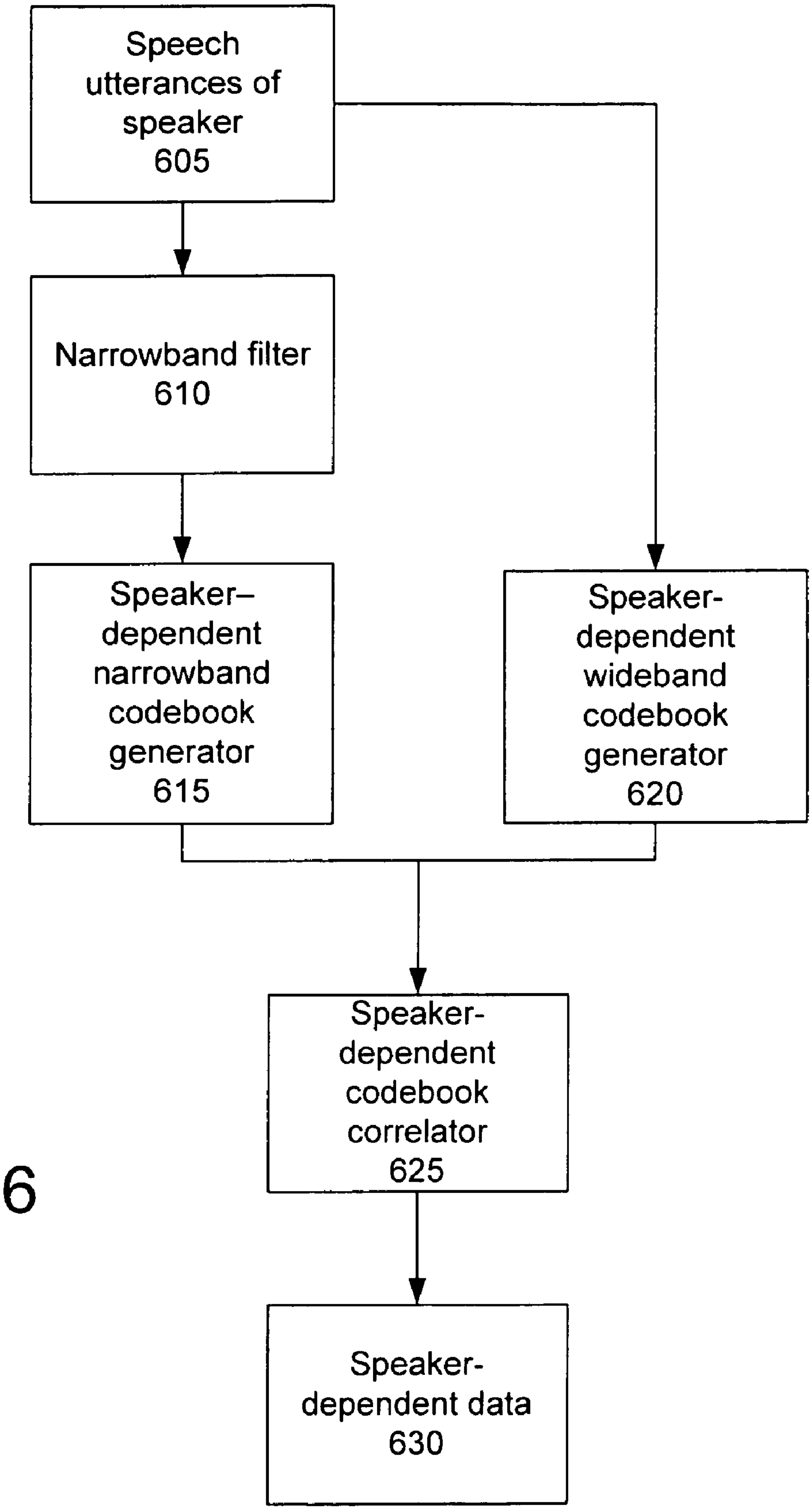
FIG. 6 illustrates one manner in which a speaker-dependent narrowband codebook and speaker-dependent wideband codebook can be generated for use as the speaker-dependent data in a system of the type shown in FIGS. 1 through 5, and 7 through 8.

One manner in which speaker-dependent narrowband and wideband codebooks may be generated at a transmitter is shown in FIG. 6. This example is applicable to the generation of speaker-dependent data in each of the systems set forth in FIGS. 1 through 5, where the speaker-dependent data comprises narrowband and wideband codebooks.

In this example, the speech utterances of the transmitting party are provided for generation of the speaker-dependent data at block 605. The speech utterances at block 605 are wideband speech signals having a bandwidth that ideally spans the complete frequency spectrum for human speech. These utterances may correspond to speech utterances of the transmitting party that were recorded during a training phase, speech utterances that are concurrently provided for use during a training phase, or speech utterances that are concurrently provided for transmission to a receiving party as well as for generation of the speaker-dependent data.

These wideband speech signals are provided to the input of a narrowband filter 610, which provides a narrowband version of the original speech utterances of the speaker at its output. The bandwidth of the narrowband filter may be selected to simulate the bandlimited characteristics of the transmission channel over which the speech utterances of the transmitting party are provided and/or the bandlimited characteristics of the particular method used by the transmitter to transmit the speech utterances.

Both the wideband version of the speech utterances of block 605 and the narrowband version of the speech utterances provided from block 610 are used to generate a pair of related codebooks. In this example, the wideband version of the speech utterances of block 605 are provided to the input of a speaker-dependent wideband codebook generator 620, while the narrowband version of the speech utterances provider from block 610 are provided to the input of a speaker-dependent narrowband codebook generator 615. The codebook generators 620 extract one or more speech characteristics from the signals provided at their respective imports to generate corresponding codebook vectors. The speaker-dependent narrowband codebook generator 615 provides a set of codebook vectors that correspond to one or more characteristics of the narrowband speech utterances provided from narrowband filter 610. Similarly, the speaker-dependent wideband codebook generator 620 provides a set of codebook vectors that correspond to one or more characteristics of the wideband speech utterances provided at block 605. In one example, the speaker-dependent codebook vectors correspond to coefficients employed in a linear predictive coding.

The narrowband codebook vectors of block 615 and the wideband codebook vectors of block 620 are correlated with one another by a speaker-dependent codebook correlator 625. The correlator 625 associates each narrowband codebook vector of the narrowband codebook generated at block 615 with a corresponding wideband codebook vector of the wideband codebook generated at block 620. The resulting correlated speaker-dependent narrowband codebook and speaker-dependent wideband codebook are provided at block 630 as at least part of the speaker-dependent data and, for example, may be stored in a database. Using these correlated codebooks, a narrowband vector in the narrowband codebook may be used as an index to a corresponding wideband vector entry in the wideband codebook.

Figure 7:
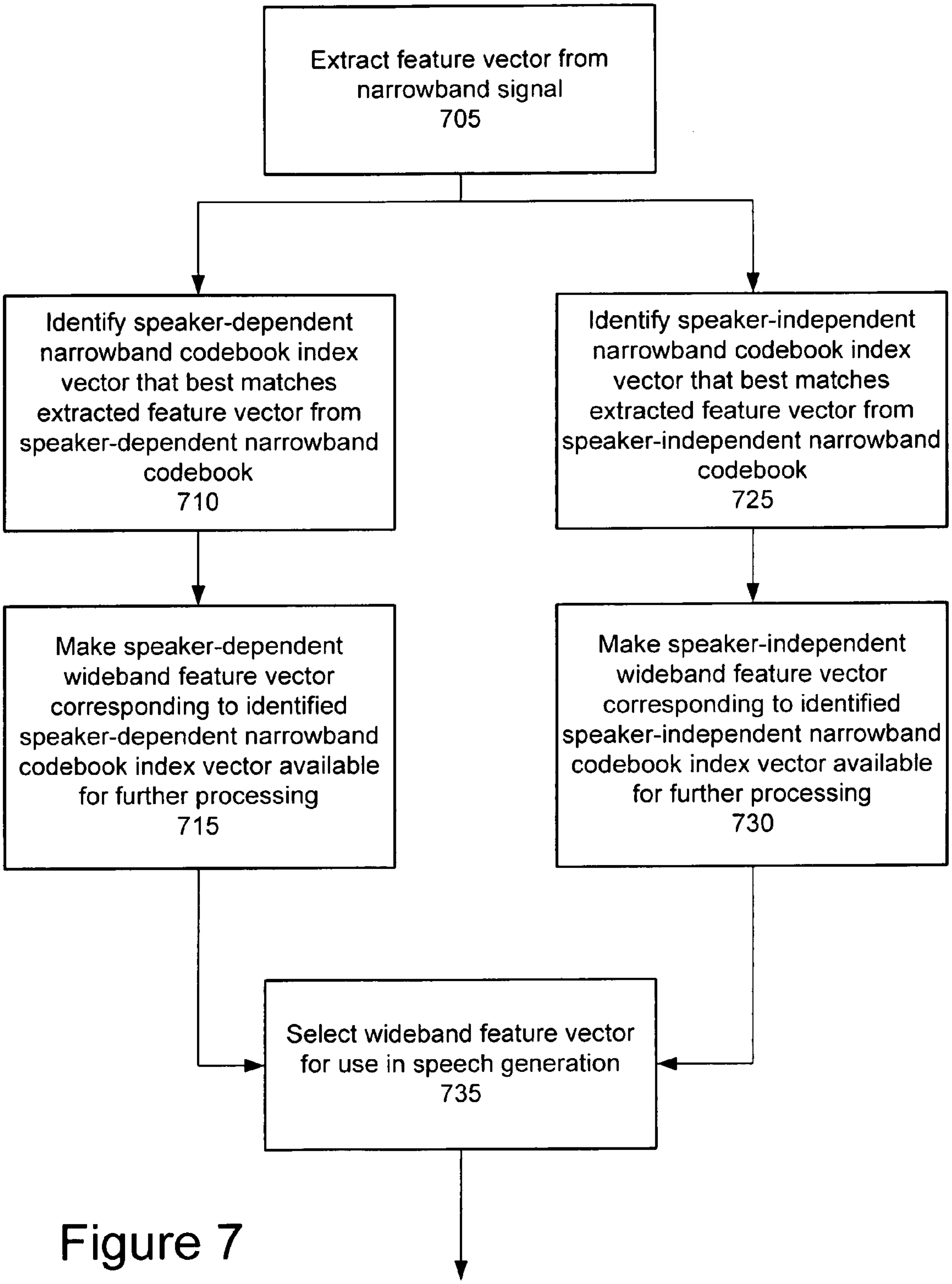
FIG. 7 illustrates one manner in which the speaker-dependent narrowband codebook and speaker-dependent wideband codebook as well as speaker-independent can be employed at a receiver in a system of the type shown in FIGS. 1 through 6.

One manner in which the speaker-dependent narrowband and wideband codebooks may be employed at a receiver is shown in FIG. 7. This example is applicable to the use of speaker-dependent data in each of the systems set forth in FIGS. 1 through 5, where the speaker-dependent data comprises narrowband and wideband codebooks.

As shown in FIG. 7, at block 705, a feature vector is extracted from the received narrowband signal containing the transmitted speech utterances of the transmitting party. The extracted feature vector corresponds to one or more speech characteristics of the received narrowband signal. At block 710, the receiver operates to identify the speaker-dependent narrowband codebook vector (or index vector) that best matches the extracted feature vector. The speaker-dependent narrowband codebook vector (or index vector) of block 710 is used to select a corresponding speaker-dependent wideband feature vector from the speaker-dependent wideband codebook. The corresponding speaker-dependent wideband feature vector from the speaker-dependent wideband codebook is made available at 715 for further processing. For example, the speaker-dependent wideband feature vector may be immediately employed to generate a wideband speech signal corresponding to the received narrowband speech utterances.

In the example shown in FIG. 7, the receiver may generate the wideband speech signal using the speaker-dependent narrowband codebook and speaker-dependent narrowband codebook, as well as from speaker-independent data. The speaker-independent data may comprise a narrowband codebook and wideband codebook correlating narrowband and wideband speech utterances of a generic user, such as a generic user that is used to factory program the receiver. As such, the receiver may operate to identify the speaker-independent narrowband codebook vector (or index vector) that best matches the extracted feature vector at block 725. The speaker-independent narrowband codebook vector (or index vector) of block 725 is used to select a corresponding speaker-independent wideband feature vector from the speaker-independent wideband codebook. The corresponding speaker-independent wideband feature vector from the speaker-independent wideband codebook is made available at 730 for further processing. At block 735, the receiver may select either the speaker-dependent wideband feature vector of block 715 or the speaker-independent wideband feature vector of block 730 to generate the wideband speech signal corresponding to the received narrowband speech utterances.

Priority of use is given to the speaker-dependent data in the systems of FIGS. 3 through 7. However, the speaker-independent data may be used to generate the wideband speech signal under conditions comprising corruption of the speaker-dependent data, production of an unacceptable result using the speaker-dependent data, and/or non-receipt/incomplete receipt of the speaker-dependent data. Once communications with the other communicating party have ceased, the memory storage used for the received speaker-dependent data may be released, if desired. Alternatively, it may be stored for future use in calls in which the communicating party is the same individual.

Figure 8:
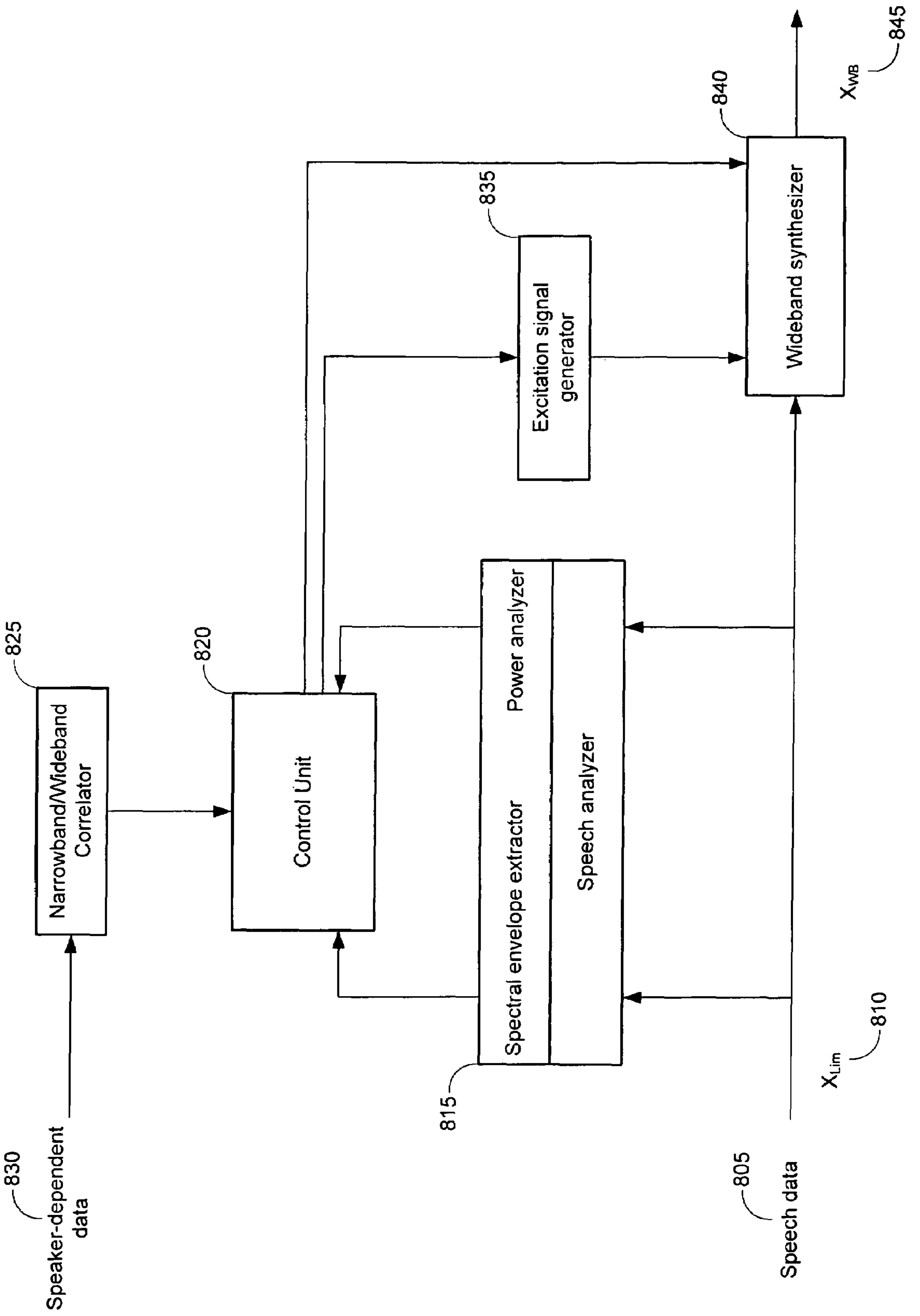
FIG. 8 is a schematic block diagram of a further embodiment of a system in which wideband speech signals are developed from received narrowband speech signals.

Some operative elements of a further system for bandwidth extension of narrowband speech signals are illustrated in FIG. 8. As shown, speech data 805 is input to the system as narrowband speech signals $x_{Lim}$ 810. The speech input signal is analyzed by an analyzer, shown generally at 815. The analyzer comprises a spectral envelope extractor for extracting the narrowband spectral envelope of the speech input signal and a power analyzer for determining the power of the narrowband excitation signal.

The data resulting from the analysis executed by analyzer 815 is provided to a control unit 820. The analyzed narrowband parameters are used to generate at least one characteristic vector that, for example, may be a cepstral vector. The characteristic vector is assigned to a corresponding vector of the narrowband codebook with the smallest distance to this characteristic vector. As a distance measure, e.g., the Itakuro-Saito distance measure, may be used. The vector determined in the narrowband codebook is mapped to the corresponding characterizing vector of the wideband codebook. The narrowband and the wideband code book constitute a pair of code books used in correlator 825.

According to the operation of this system, not only speech data 805 are transmitted from one party to another but also speaker-dependent codebooks are generated before and/or during the communication for one or both of the communication partners. After, for example, the codebooks are completely generated by the system at one party, they are transmitted to the other party. Thus, in addition to speech data 805 speaker-dependent data comprising a pair of speaker-dependent codebooks are transmitted from one party to the other.

A wideband excitation signal generator 835 is also controlled by the control unit 820 and is provided to generate the wideband excitation signals corresponding to the respective lowband excitation signals that are obtained by the analyzer 815. A wideband synthesizer 840 ultimately generates wideband speech signals $x_{WB}$ 845 on the basis of the wideband excitation signals and the wideband spectral envelopes.

In each of the foregoing systems, generation of the wideband acoustic signal may be performed in a number of different manners. For example, the entire wideband speech signal may be synthesized using the selected wideband feature vector. Alternatively, the wideband speech signal may be synthesized by supplementing the received narrowband acoustic signal with extended bandwidth signal components generated from the wideband feature vector. In the latter instance, the wideband feature vector is used to synthesize the appropriate lowband and/or highband signal components that are missing from the received narrowband signal. These components may then be added to the received narrowband signal (or its representation) to generate the desired wideband speech signal.

In the example of FIG. 8, the wideband signals $x_{WB}$ 845 comprise lowband and highband speech portions that are missing in the detected in narrowband signals 810. If, for example, the narrowband signal has a frequency range from 300 Hz to 3.4 kHz, the lowband and the highband signals may have frequency ranges from 50-300 Hz and from 3.4 kHz to a predefined upper frequency limit with a maximum of half of the sampling rate, respectively.

The foregoing systems may be implemented using a combination of hardware and software. To this end, one or more computer programs comprising one or more computer readable media having computer-executable instructions for performing the operations set forth above may be provided for download to a corresponding hardware set.

Employment of the foregoing systems in fixed-installation phones, mobile phones and hands-free sets significantly improves the intelligibility of speech signals at the locus of the receiving party. In the rather noisy environment of vehicular cabins, the disclosed systems advantageously may be used for communications that take place via hands-free sets.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. An electronic communication method comprising:

transmitting a narrowband speech signal comprising a narrowband version of speech utterances of a speaker;

transmitting speaker-dependent data comprising data correlating narrowband versions of the speech utterances of the speaker with corresponding wideband versions of the speech utterances of the speaker;

receiving the narrowband speech signal and the speaker-dependent data; and using the narrowband speech signal and the speaker-dependent data to generate a wideband speech signal corresponding to a wideband version of the speech utterances of the speaker.

2. The electronic communication method of claim 1, where the transmission of the speaker-dependent data comprises:

transmitting a speaker-dependent narrowband codebook having a plurality of speaker-dependent narrowband code vectors; and transmitting a speaker-dependent wideband codebook having a plurality of speaker-dependent wideband code vectors;

where the speaker-dependent narrowband code vectors of the speaker-dependent narrowband codebook are respectively associated with corresponding speaker-dependent wideband code vectors in the speaker-dependent wideband codebook.

3. The electronic communication method of claim 2, where usage of the narrowband speech signal and the speaker-dependent data to generate the wideband speech signal comprises:

analyzing the received narrowband speech signal to extract a feature vector;

identifying a speaker-dependent narrowband code vector in the speaker-dependent narrowband codebook that best matches the extracted feature vector; and using the speaker-dependent wideband code vector associated with the identified speaker-dependent narrowband code vector to generate the wideband speech signal.

4. The electronic communication method of claim 1, where the transmission of the narrowband speech signal and the transmission of the speaker-dependent data take place over a single transmission channel.

5. The electronic communication method of claim 1, where the transmission of the narrowband speech signal and the transmission of the speaker-dependent data take place over separate transmission channels.

6. The electronic communication method of claim 1, further comprising:

providing speaker-independent data comprising data correlating narrowband versions of general speech utterances with corresponding wideband versions of the general speech utterances; and using the narrowband speech signal and the speaker-independent data to generate the wideband speech signal.

7. The electronic communication method of claim 1, further comprising:

providing speaker-independent data comprising data correlating narrowband versions of general speech utterances with corresponding wideband versions of the general speech utterances; and using the speaker-independent data to generate the wideband speech signal under conditions comprising corruption of the speaker-dependent data, production of an unacceptable result using the speaker-dependent data, or non-receipt of the speaker-dependent data.

8. The electronic communication method of claim 7, where the provision of the speaker-independent data comprises providing a speaker-independent narrowband codebook having a plurality of speaker-independent narrowband code vectors and a corresponding speaker-independent wideband codebook having a plurality of speaker-independent wideband code vectors, where the speaker-independent narrowband code vectors or the speaker-independent narrowband codebook are respectively associated with corresponding speaker-independent wideband code vectors in the speaker-independent wideband codebook.

9. The electronic communication method of claim 8, where usage of the narrowband speech signal and the speaker-independent data to generate the wideband speech signal comprises:

analyzing the received narrowband speech signal to extract a feature vector;

identifying a speaker-independent narrowband code vector in the speaker-independent narrowband codebook that best matches the extracted feature vector; and using the speaker-independent wideband code vector associated with the identified speaker-independent narrowband code vector to generate the wideband speech signal.

10. The electronic communication method of claim 1, where the transmission of the speaker-dependent data comprises transmitting speaker-dependent parameters of a neural network used in the generation of the wideband speech signal.

11. The electronic communication method of claim 1, further comprising:

generating the speaker-dependent data before transmitting the narrowband speech signal; and waiting until all of the speaker-dependent data has been generated before transmission of the speaker-dependent data is initiated.

12. The electronic communication method of claim 1, where the transmission of the narrowband speech signal and the transmission of the speaker-dependent data occur in a generally concurrent manner.

13. A method for electronically communicating speech between a first party and a second party, the method comprising:

transmitting a first narrowband speech signal comprising a narrowband version of speech utterances of the first party;

transmitting first speaker-dependent data comprising data correlating narrowband versions of the speech utterances of the first party with corresponding wideband versions of the speech utterances of the first party;

receiving the first narrowband speech signal and the first speaker-dependent data by the second party;

using the first narrowband speech signal and the first speaker-dependent data to generate a first wideband speech signal corresponding to a wideband version of the speech utterances of the first party at a locus of the second party;

transmitting a second narrowband speech signal comprising a narrowband version of speech utterances of the second party;

transmitting second speaker-dependent data comprising data correlating narrowband versions of the speech utterances of the second party with corresponding wideband versions of the speech utterances of the second party;

receiving the second narrowband speech signal and the second speaker-dependent data by the first party; and using the second narrowband speech signal and the second speaker-dependent data to generate a second wideband speech signal corresponding to a wideband version of the speech utterances of the second party at a locus of the first party.

14. The electronic communication method of claim 13, where the transmission of the first speaker-dependent data comprises:

transmitting a first speaker-dependent narrowband codebook having a first plurality of speaker-dependent narrowband code vectors; and transmitting a first speaker-dependent wideband codebook having a first plurality of speaker-dependent wideband code vectors:

where the speaker-dependent narrowband code vectors of the first speaker-dependent narrowband codebook are respectively associated with corresponding speaker-dependent wideband code vectors in the first speaker-dependent wideband codebook.

15. The electronic communication method of claim 13, where the transmission of the first speaker-dependent data comprises transmitting first speaker-dependent parameters of a first neural network used in the generation of the first wideband speech signal.

16. The electronic communication method of claim 13, where the transmission of the first narrowband speech signal and the transmission of the first speaker-dependent data take place over a single transmission channel.

17. The electronic communication method of claim 13, where the transmission of the first narrowband speech signal and the transmission of the first speaker-dependent data take place over separate transmission channels.

18. A system for use in communicating speech signals to a receiving party, the system comprising:

a transducer for converting speech utterances of a speaker into a wideband electronic waveform;

a speaker-dependent data generator adapted to generate speaker-dependent data correlating narrowband versions of speech utterances of the speaker with corresponding wideband versions of the speech utterances of the speaker, where the wideband versions of the speech utterances of the speaker correspond to the wideband electronic waveform provided through operation of the transducer;

a transmitter adapted to transmit the speaker-dependent data as well as a narrowband signal corresponding to a narrowband version of the speech utterances of the speaker, where the narrowband version of the speech utterances of the speaker comprise the speech utterances that are to be communicated to a receiving party.

19. The system of claim 18, where the speaker-dependent data generator comprises:

a wideband linear predictive code generator adapted to generate linear predictive codes for wideband versions of the speech utterances using wideband electronic waveforms provided through operation of the transducer;

a narrowband filter generating narrowband versions of speech utterances of the speaker using wideband electronic waveforms provided through operation of the transducer;

a narrowband linear predictive code generator adapted to generate linear predictive codes for narrowband versions of the speech utterances provided by the narrowband filter; and a correlator for associating the linear predictive codes generated by the wideband linear predictive code generator with the linear predictive codes generated by the narrowband linear predictive code generator.

20. The system of claim 18, further comprising one or more memory storage units storing the speaker-dependent data generated by the speaker-dependent data generator.

21. The system of claim 18, where the transmitter is adapted to transmit the speaker-dependent data and the narrowband signal over a single transmission channel.

22. The system of claim 18, where the transmitter is adapted to transmit the speaker-dependent data and the narrowband signal over separate transmission channels.

23. The system of claim 18, where the speaker-dependent data comprises parameters of a neural network.

24. A system for use in communicating speech signals received from a transmitting party, the system comprising:

a receiver adapted to receive a narrowband signal corresponding to a narrowband version of speech utterances of the transmitting party and to receive speaker-dependent data correlating narrowband versions of the speech utterances of the transmitting party with corresponding wideband versions of the speech utterances of the transmitting party;

an analyzer adapted to identify selected portions of the speaker-dependent data that best correspond to the received narrowband signal; and a wideband signal generator adapted to generate a wideband speech signal using the selected portions of the speaker-dependent data identified by the analyzer.

25. The system of claim 24, where the speaker-dependent data comprises:

a speaker-dependent narrowband codebook having a plurality of speaker-dependent narrowband code vectors; and a speaker-dependent wideband codebook having a plurality of speaker-dependent wideband code vectors;

where the speaker-dependent narrowband code vectors of the speaker-dependent narrowband codebook are respectively associated with corresponding speaker-dependent wideband code vectors in the speaker-dependent wideband codebook.

26. The system of claim 24, where the speaker-dependent data comprises speaker-dependent parameters of a neural network used in the generation of the wideband speech signal.

27. The system of claim 24, further comprising one or more memory storage units storing the speaker-dependent data received by the receiver.

28. The system of claim 24, where the receiver is adapted to receive the speaker-dependent data and the narrowband signal over a single transmission channel.

29. The system of claim 24, where the receiver is adapted to save the speaker-dependent data and the narrowband signal over separate transmission channels.

30. A non-transitory computer-readable storage medium with an executable computer program stored thereon, wherein the computer program instructs a microprocessor to perform a method, the method comprising:

transmitting a narrowband speech signal comprising a narrowband version of speech utterances of a speaker;

transmitting speaker-dependent data comprising data correlating narrowband versions of the speech utterances of the speaker with corresponding wideband versions of the speech utterances of the speaker;

receiving the narrowband speech signal and the speaker-dependent data; and using the narrowband speech signal and the speaker-dependent data to generate a wideband speech signal corresponding to a wideband version of the speech utterances of the speaker.

* * * * *

UNITED STATES PATENT AND TRADEMARK OFFICE

CERTIFICATE OF CORRECTION

PATENT NO. : 7,693,714 B2
APPLICATION NO. : 11/343939
DATED : April 6, 2010
INVENTOR(S) : Iser et al.

It is certified that error appears in the above-identified patent and that said Letters Patent is hereby corrected as shown below:

At column 4, line 32, "The receiver 110..." should be changed to "At block 145, the receiver 110..."
At column 5, line 7, "...at block that..." should be changed to "...at block 220 that..."
At column 7, line 32, "Save document" should be deleted.
At column 11, line 66, "...speaker-dependent data..." should be changed to "...speaker-dependent data 830..."

Signed and Sealed this
Twenty-first Day of June, 2011

David J. Kappos

David J. Kappos
*Director of the United States Patent and Trademark Office*